United States Patent
Jerichow et al.

(10) Patent No.: US 11,843,345 B2
(45) Date of Patent: Dec. 12, 2023

(54) METHOD FOR CONTROLLING A MOTOR UNIT, AND MOTOR UNIT FOR CARRYING OUT SUCH A METHOD

(71) Applicant: Vitesco Technologies Germany GmbH, Hannover (DE)

(72) Inventors: Edgar Jerichow, Nuremberg (DE); Michael Winkler, Erlangen (DE)

(73) Assignee: Vitesco Technolgies GmbH, Regensburg (DE)

( * ) Notice: Subject to any disclaimer, the term of this patent is extended or adjusted under 35 U.S.C. 154(b) by 0 days.

(21) Appl. No.: 17/654,160

(22) Filed: Mar. 9, 2022

(65) Prior Publication Data

US 2022/0337180 A1 Oct. 20, 2022

Related U.S. Application Data

(63) Continuation of application No. PCT/EP2020/074317, filed on Sep. 1, 2020.

(30) Foreign Application Priority Data

Sep. 10, 2019 (DE) ...................... 10 2019 213 752.0

(51) Int. Cl.
*H02P 6/16* (2016.01)
*H02P 6/08* (2016.01)

(52) U.S. Cl.
CPC .................. *H02P 6/16* (2013.01); *H02P 6/08* (2013.01); *H02P 2203/03* (2013.01)

(58) Field of Classification Search
CPC ........... H02P 6/16; H02P 6/08; H02P 2203/03
(Continued)

(56) References Cited

U.S. PATENT DOCUMENTS 6,832,121 B1 12/2004 Albrecht et al.
2002/0067148 A1 6/2002 Moddemann et al.
(Continued)

FOREIGN PATENT DOCUMENTS

CN 107750429 A 3/2018
DE 19529430 A1 1/1997
(Continued)

OTHER PUBLICATIONS

DE 112009001471 T5 "Valve Control Device and Valve Device" Date Published: Apr. 4, 2011 Inventor Information Name: Kawamura Satoshi (Year: 2011).*
(Continued)

*Primary Examiner* — Jorge L Carrasquillo

(57) ABSTRACT

A method for monitoring a motor unit is provided. The method includes: detecting a starting rotor position: ascertaining a non-safety-critical position tolerance range; ascertaining a position offset for the rotor as a function of the ascertained position tolerance range; ascertaining a target rotor position for the rotor based on the starting rotor position and the position offset; specifying a target control pattern based on the ascertained target rotor position; generating and applying a motor control pattern to the motor unit to rotate the rotor to the specified target rotor position using the target control pattern; detecting an actual control pattern controlling the motor unit at an interface between the motor controller and the motor unit; detecting an actual rotor position resulting from the rotation of the rotor using the motor control pattern; and feeding back both the detected actual control pattern and the detected actual rotor position for verification thereof.

12 Claims, 4 Drawing Sheets

(58) Field of Classification Search
USPC .......................................................... 318/799
See application file for complete search history.

(56) References Cited

U.S. PATENT DOCUMENTS

| | | | | |
|---|---|---|---|---|
| 2008/0088264 | A1* | 4/2008 | Tsuchida | H02P 6/08 |
| | | | | 318/287 |
| 2009/0058345 | A1* | 3/2009 | Cooper | G05B 19/21 |
| | | | | 318/602 |
| 2014/0265960 | A1 | 9/2014 | Sonoda | |
| 2016/0241173 | A1 | 8/2016 | Prußmeier | |
| 2018/0275627 | A1 | 9/2018 | Hashimoto et al. | |

FOREIGN PATENT DOCUMENTS

| | | |
|---|---|---|
| DE | 19908230 A1 | 8/2000 |
| DE | 10041606 A1 | 3/2002 |
| DE | 102004019284 | 11/2005 |
| DE | 102014208527 A1 | 11/2015 |
| EP | 3477846 A1 | 5/2019 |
| JP | H11341897 A | 12/1999 |
| JP | 2002112567 A | 4/2002 |
| JP | 2014180119 A | 9/2014 |
| WO | 2017022170 A1 | 5/2018 |

OTHER PUBLICATIONS

International Search Report and Written Opinion dated Nov. 10, 2020 from corresponding International Patent Application No. PCT/EP2020/074317.
German Office Action dated Apr. 21, 2020 for corresponding German Patent Application No. 10 2019 213 752.0.
Japanese Office Action dated Jun. 7, 2023 for corresponding Japanese Patent Application No. 2022-508930.
Japanese Notice of Allowance dated Jun. 13, 2023 for corresponding Japanese Patent Application No. 2022-508930.
1 Chinese Office Action dated Aug. 1, 2023 for corresponding Patent Application No. 202080063609.7.

* cited by examiner

METHOD FOR CONTROLLING A MOTOR UNIT, AND MOTOR UNIT FOR CARRYING OUT SUCH A METHOD

CROSS-REFERENCE TO RELATED APPLICATIONS

This application claims the benefit of International Application PCT/EP2020/074317, filed Sep. 1, 2020, which claims priority to German Application 10 2019 213 752.0, filed Sep. 10, 2019. The disclosures of the above applications are incorporated herein by reference.

TECHNICAL FIELD

The disclosure relates to a method for controlling a motor unit, and to a motor unit for carrying out the method.

BACKGROUND

Motor units, for example in the form of electrical machines, are known from the prior art. For example, electrical machines are designed as actuators and stator-rotor assemblies.

Electrical machines, in particular motor units, are used, for example, in vehicles for operation thereof and, in so doing, may be part of a safety-related application. Safety-related applications in a vehicle have to be moved to a safe state in the event of a safety-related malfunction. For example, ISO standard 26262 specifies several ASIL (short for: Automotive Safety Integrity Level) safety requirement levels for safety-related electrical/electronic applications in motor vehicles.

SUMMARY

The disclosure provides a method for controlling a motor unit and a motor unit for carrying out the method, which allows the motor unit to be controlled reliably.

One aspect of the disclosure provides a method for controlling a motor unit having at least a rotor and a stator, a starting rotor position is first detected. At least one non-safety-critical position tolerance range for a rotor position is then specified and/or ascertained. In addition, at least one position offset for the rotor is specified or ascertained as a function of the position tolerance range. Here, the position offset is specified and/or ascertained, for example, within the specified or determined position tolerance range, so that the position offset that can be set on the rotor always lies within the position tolerance range. For example, an angular value and/or a sense of direction is specified or ascertained as the position offset. For example, a fixed position offset for the rotor is specified or ascertained in the form of a constant angular value and/or a constant sense of direction.

In a subsequent step, a target rotor position is ascertained based on the starting rotor position and the position offset. Based on the target rotor position, a target control pattern is specified, A motor control pattern is generated and applied to the motor unit to rotate the rotor to the specified target rotor position using a motor controller, the motor control pattern is based on the target control pattern. The method further provides that an actual control pattern controlling the motor unit is detected at an interface between the motor controller and the motor unit. Furthermore, an actual rotor position resulting from the rotation of the rotor using the actual control pattern is detected, where both the detected actual control pattern and the detected actual rotor position are fed back to the motor controller for verification thereof.

The method reliably and simply makes it possible for the rotor to always be set to a rotor position which lies in the non-safety-critical position tolerance range.

A non-safety-critical position tolerance range is understood to mean, for example, a maximum range of movement or position tolerance range for the rotor, within which the rotor is allowed to move and is driven in a corresponding manner, without the motor unit entering a safety-critical state, for example without causing critical situations which relate to the safety requirements of the motor unit. The non-safety-critical position tolerance range includes maximum and minimum threshold or limit values for permissible deviations of the rotor position from the starting rotor position.

For example, critical situations may lead to failure of the motor unit or at least individual components, for example switching elements of the motor unit, or to a short circuit. This can lead to an undesired high current flow and thus to heating of the components of the motor unit, as a result of which the components may be damaged. Using the method described, such situations can be largely reduced or even avoided. This allows driving safety to be increased while the vehicle is in operation. Furthermore, critical situations may lead to unintentional engagement of a transmission gear or to unintentional closing of a clutch, which may likewise be reduced or even avoided using the method.

Here, the limit values may deviate symmetrically or asymmetrically from the starting rotor position. For example, equally large minimum and maximum limit values may be specified or ascertained for symmetrical deviations from the starting rotor position. As an alternative, minimum and maximum limit values of different magnitudes may be specified or ascertained for asymmetrical deviation. The non-safety-critical position tolerance range, in particular the limit values thereof, for the motor unit in question is/are stored in a memory, for example.

In some implementations, the specified position tolerance range for the rotor is determined and/or specified based on at least one or more upper position limit value(s) and/or at least one or more lower position limit value(s). For example, when determining the specified position tolerance range and/or a control tolerance range, measurement tolerances of the rotor position sensor, manufacturing tolerances of the motor unit and/or position tolerances of the rotor have to be taken into account using at least one tolerance factor.

Furthermore, it is provided that a movement and/or direction of movement of the rotor is determined continuously. For example, both the actual rotor position and an actual sense of direction of the momentary actual rotor movement are detected or ascertained continuously, for example cyclically, for example every 10 ms or 50 ms. In some examples, angular values and/or angular range values are ascertained as rotor position values. For example, the respective direction of movement, such as direction of rotation, of the rotor is ascertained from a delta in or a deviation between two rotor positions. As the delta or deviation, a difference, for example angular and/or distance difference, between the starting rotor position and the actual rotor position and/or between the target rotor position and the actual rotor position and/or between two actual rotor positions, for example, is or are ascertained. A respective opposite direction is precluded by a defined maximum rotation speed.

In some examples, the method further renders it possible to carry out a diagnosis or check of the functionality each time the motor unit is commissioned. In some examples, the rotor position is ascertained again each time the motor unit is commissioned since, for example, no fixed rotor end positions are defined or can be defined.

The starting rotor position can be detected, for example, before the motor unit is started or when the motor unit is in an inoperative state or when the motor unit is in an operating state using a rotor position sensor.

Furthermore, the motor unit includes at least one motor controller. The motor controller is, for example, a control unit or a microcomputer which detects or which is supplied with input signals, such as sensor signals, analog signals and digital signals for example. The input signals are processed to form output signals, such as control, information, safety and/or regulating signals, using the motor controller.

For example, at least the detected starting rotor position and the ascertained or specified non-safety-critical position tolerance range are supplied to the motor controller and/or an adaptive control module of the motor controller as input signals. Based on the non-safety-critical position tolerance range and/or the detected starting rotor position, the position offset, for example a maximum possible positive or negative position offset, which lies within the non-safety-critical position tolerance range, is ascertained or specified for the rotor using the motor controller. For this purpose, a control module is part of the motor controller or is adaptively connected upstream of the motor controller.

Based on the starting rotor position and the position offset, the target rotor position is ascertained by the motor controller. Based on the target rotor position, the associated target control pattern for driving the rotor is generated, where the rotor is actively driven and moved to the specified target rotor position using the target control pattern. Here, at least one direction of movement of the rotor and compliance with the non-safety-critical position tolerance range can be monitored. For example, a rotor position curve can be monitored. The rotor is driven, for example, by way of driving a stator integrated in the motor unit.

For example, the motor unit is an electric motor or an actuator arrangement. Using the method described, faulty or failed driving, for example according to ISO standard 26262, can be identified reliably and at an early stage in the motor unit. In some implementations, the motor unit is a three-phase motor. Alternatively, the motor unit is a direct-current motor, such as what is known as a brushless direct-current motor.

In some implementations, the rotor position sensor is a conventional rotation sensor, such as a rotary encoder, angle sensor or angle encoder with angle and/or sense of direction sensing for example.

Using the method described, control of the motor unit can be monitored, diagnosed and managed to ensure that the motor unit is always in a safe operating state. The method further allows the motor unit to be led or moved to a safe operating state in an active and controlled manner in the event of a safety-related malfunction. For example, safety requirement levels of ISO standard 26262 up to level ASIL C can be met as a result. The safe operating state is achieved by way of the rotor being moved, for example driven and rotated, to the specified target rotor position within the non-safety-critical position tolerance range.

For example, during commissioning, that is to say when starting up the motor unit, and/or during operation of the motor unit, the rotor movement is monitored. Using the method described, it is advantageously identified at an early stage whether reliable operation of the motor unit is possible as a function of the starting rotor position and an initial rotor movement or a further rotor movement.

A further aspect provides that a safety signal for the motor unit is generated and/or output and/or transmitted based on the fed-back actual control pattern and/or the fed-back actual rotor position. The safety signal is, for example, a warning signal, such as an optical and/or acoustic warning signal, an information signal to the workshop and/or a control signal for the motor controller, for example for deactivating the motor controller when a critical rotor position and/or rotor driving is detected or for activating and maintaining the motor controller when a safe rotor position and/or rotor driving are/is detected.

For example, in the case of ascertained and possible impermissible overshooting of the non-safety-critical target position tolerance range (also called target rotor movement range) by a momentary rotor movement, driving of the rotor can be interrupted using a safety signal. That is to say, driving of the rotor is interrupted if the initial or actual rotor movement deviates from a requested target rotor movement specified by the target control pattern. The target rotor position, which lies within the non-safety-critical position tolerance range, thus sets the rotor to a non-safety-critical, verified, checked and monitored position. If no further malfunctions are detected, the rotor or the motor unit can be operated, where the rotor position is set to the target rotor position. For example, the target rotor position is an ascertained optimal rotor position for driving the rotor, for example during commissioning or during operation of the motor unit.

In some examples, in a first verification stage, the detected actual control pattern is compared with the target control pattern, where, if the actual control pattern lies within a specified control tolerance range, a first verification signal is generated as a safety signal, otherwise the first verification signal is not generated.

The first verification signal is, for example, an activation signal which activates driving of the rotor. Failure to generate the first verification signal deactivates the rotor or ensures that the rotor remains deactivated. A false signal may also be generated.

The control tolerance range is, for example, a switching/hardware/operating tolerance range for the control pattern or the control profile and describes the tolerance (for example from +/−1% to +/−3%) with which the control signals/pulses may be generated. The control tolerance range is a non-safety-critical control range which limits the generated control signals or control pulses upward or downward (with a maximum lower and/or maximum upper deviation). The control tolerance range is determined, for example, based on at least one or more upper control limit values and/or at least one or more lower control limit values for the target driving pattern. The control limit values depend, for example, on software/hardware tolerances of the motor controller, such as on switching tolerances of electronic components for example.

As an alternative or in addition, in one or in the first verification stage, the detected actual control pattern is compared with the target control pattern. If the actual control pattern lies within a or the specified control tolerance range, the motor controller, such as the target control pattern, is or remains activated, otherwise the motor controller, such as the target control pattern, is deactivated (for example interrupted) or remains deactivated.

Another aspect of the disclosure provides that in a second verification stage, the detected actual rotor position is compared with the target rotor position. If the detected actual rotor position is the same as the specified target rotor position and/or lies within the specified non-safety-critical position tolerance range, a second verification signal is generated as a safety signal, otherwise the second verification signal is not generated or an error signal is generated.

The second verification signal may likewise be, for example, an activation signal which activates driving of the rotor. Failure to generate the second verification signal can deactivate the rotor or can ensure that the rotor remains deactivated.

As an alternative or in addition, in the second verification stage, the detected actual rotor position is compared with the target rotor position. If the detected actual rotor position is the same as the specified target rotor position and/or lies within the specified position tolerance range, the motor controller is or remains activated, such as the target control pattern is or remains activated, otherwise the motor controller, such as the target control pattern, is deactivated (for example interrupted) or remains deactivated.

In some implementations, functions of the motor controller are checked by back-measuring the control pattern applied. For example, the control pattern is validated by the back-measurement. Correct functioning of the motor controller, such as the peripheral thereof, is checked by back-measuring the control pattern produced in a motor output stage.

In some implementations, after active driving of the rotor as a function of the control pattern, a momentary actual operating position of the rotor resulting therefrom is detected, where this is compared with the ascertained target rotor position. When correspondence of the actual rotor position and the target rotor position is ascertained taking into account sensor tolerances, the motor controller is considered to be validated.

The method described above for controlling a motor unit is used for checking and/or monitoring the motor controller of the motor unit during starting, during operation or after operation of the motor unit.

For example, correct execution of the movement of the rotor is checked and monitored by way of back-measuring the actual rotor position and the actual control pattern of the rotor. The actual rotor position is a rotor position which corresponds to the control pattern and is achieved by driving the stator as a function of the control pattern. The actual rotor position generates a new sensor signal transmitted using the rotor position sensor and thus corresponds to a new rotor position. For example, the actual rotor position is understood to mean a position which the rotor assumes after being driven as a function of the applied target control pattern. When the rotor approaches the target rotor position and is within the position tolerance range initially ascertained, execution of the movement is classified as being error-free and therefore correct.

Therefore, what is known as an in-the-loop check of the entire motor unit, for example of the entire motor controller, can be carried out using the method described. A check in respect of whether the requirements of the target control pattern can be met is further performed by way of back-measuring the actual control pattern applied.

For example, the target values, such as target rotor position and/or target control pattern and/or position tolerance range and/or control tolerance range, are stored in a motor controller and/or diagnostic unit coupled to the motor unit. The motor controller can have suitable software for this, that is to say a suitable application program for generating the position tolerance range, the target rotor position, the target control pattern and/or the control tolerance range.

In some examples, the software is configured to execute the method. The software is set up to monitor driving of the rotor performed by the motor controller. For example, the software is designed to carry out control, such as monitoring, of the entire motor controller. The software transmits the target control pattern to motor connections via a peripheral of the motor controller and monitors the actual direction of movement and also compliance with the position tolerance range of the rotor.

One possible refinement of the method provides that angular values, such as, for example, +30° or +60°, are ascertained or specified as the target rotor position, and angular range values, in particular of ±30° to ±35°, are ascertained or specified as the position tolerance range. For example, the angular range value is ±30° to 35°, for example ±15° to 25°, such as ±20°, in relation to the detected starting rotor position of the rotor. For example, an axis, such as in the form of a straight line, is formed based on the detected starting rotor position of the rotor, around which axis an angular range for defining the position tolerance range and/or the target rotor position are or is determined. For example, the axis of the starting rotor position forms an axis of symmetry.

In some implementations, the ascertained target rotor position is used as a reference position for ascertaining a target control pattern for driving the rotor. For example, the target control pattern is a control scheme which provides control information for operating the rotor unit. Here, the control information is transmitted to the motor unit as output signals, such as control pulses. The rotor can thus be driven in accordance with the specifications of the target control pattern. For example, the stator is coupled to the motor controller, where the motor controller controls the stator.

Ascertaining the target control pattern and generating the resulting motor control pattern (control signals, control pulses) to be applied are performed, for example, by software integrated in the motor controller. In some examples, the software includes stored algorithms in order to provide stored and/or ascertained reference values, threshold or limit values and/or target values, such as values for the position offset, limit values for the position tolerance range, the target rotor position located in this range and/or the resulting target control pattern.

In some examples of the method, the target control pattern is transmitted to the motor controller of the motor unit for driving the rotor. For example, the motor controller includes a number of hardware components that are designed to operate the motor unit.

In some implementations, at least one motor control pattern, such as a control signal/control pulse pattern, for an operating voltage and/or a current flow and/or a rotation speed and/or a rotational speed and/or a rotation angle for driving the rotor is specified using the target control pattern. Here, range values, such as maximum values and/or minimum values, can be specified for the motor control pattern and thus the respective requirement for operating the motor unit. Various parameters of the motor unit, such as maximum permissible rotational speed and/or operating voltage, are taken into account here. For example, optimized driving of the rotor has an effect on the efficiency of the motor unit, operating costs, possible running noise, service life and power consumption. For example, the stator, such as the stator winding thereof, such as coils, for example, is operated with a maximum permissible current or has an operating voltage applied to it. The rotational speed of the rotor can also be taken into account when ascertaining the operating voltage to be applied. For example, a suitable current flow is set for the stator as a function of the target rotor position ascertained as the reference position using the control pattern.

Another aspect of the disclosure provides a motor unit for carrying out the method described above. For example, the motor unit is part of a vehicle. The motor unit includes at least a stator and a rotor and also a rotor position sensor for detecting a rotor position and a motor controller for rotating the rotor. The motor controller drives and operates the motor unit by applying a control pattern and a control module is provided. The module is connected upstream of the motor controller or is part of the motor controller, and the motor controller and the control module are set up in such a way as to check and, if necessary, to activate or to deactivate the motor controller before or after operation or during operation of the motor unit.

In some implementations, the motor unit includes the control module, such as a diagnostic unit for ascertaining an operating state that relates at least to the rotor. The diagnostic unit is provided, for example, in order to monitor the course of the rotor position when driving the rotor.

In some examples, the motor unit is designed to perform what is known as an in-the-loop check.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
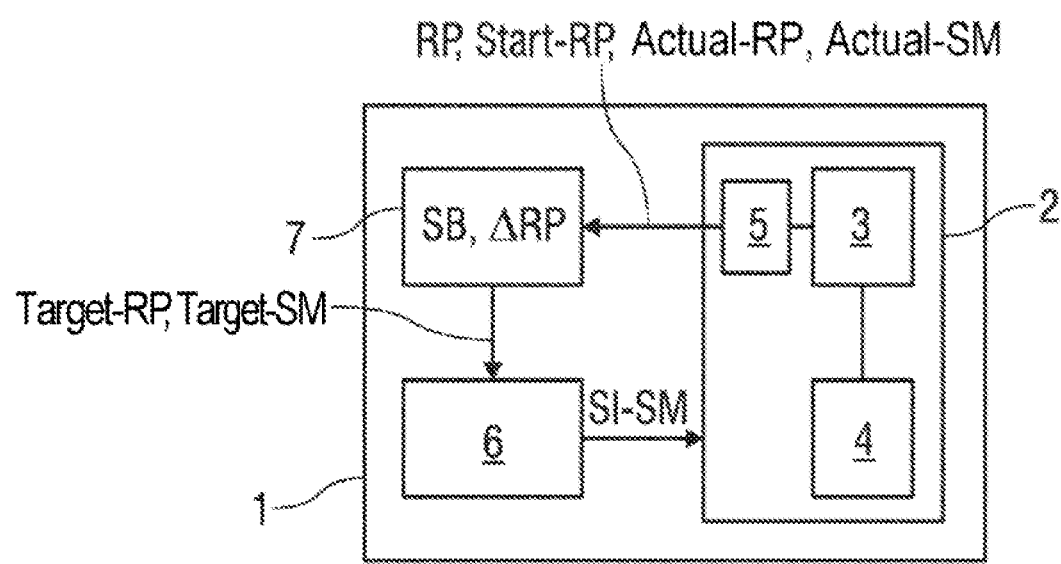
FIG. 1 schematically shows an exemplary vehicle with a motor unit, having at least a rotor and a stator and also a motor controller and a control module.

FIG. 1 schematically shows an exemplary vehicle 1 with a motor unit 2. The motor unit 2 is designed to operate the vehicle 1 or at least to operate individual vehicle components. For example, the motor unit 2 is an electric motor unit. For example, the motor unit 2 is an actuator unit or an electric motor, such as a direct-current motor.

The motor unit 2 includes a stator 3 and a rotor 4 coupled to the stator 3. In some examples, the stator 3 and the rotor 4 are magnetically coupled to one another, where the rotor 4 can be controlled by energizing the stator 3. When electrical energy is applied to the stator 3, a magnetic field is generated, as a result of which the rotor 4 can be set in motion due to mutual magnetic attraction and repulsion forces.

The motor unit 2 further includes a rotor position sensor 5, which detects a rotor position RP, such as a starting rotor position Start-RP and/or an actual rotor position Actual-RP for example.

Furthermore, the motor unit 2 includes a motor controller 6 and a control module 7 which is connected upstream of the motor controller 6 or is adaptively connected or is implemented in the motor controller 6.

The motor controller 6 and the adaptive control module 7 are set up to perform the method described below for controlling the motor unit 2.

Here, at least one non-safety-critical position tolerance range SB is initially specified or ascertained. At least one position offset ΔRP for the rotor 4 is determined or specified as a function of the determined or specified position tolerance range SB.

Based on the starting rotor position Start-RP and the position offset ΔRP, a target rotor position Target-RP is then ascertained for the rotor 4 using the adaptive control module 7, based on which target rotor position a target control pattern Target-SM is determined. The target control pattern is supplied to the motor controller 6. A motor control pattern SI-SM is generated for the motor unit 2 based on the target rotor position Target-RP and the target control pattern Target-SM and applied to the motor unit 2 to rotate the rotor 4 to the specified target rotor position Target-RP using the motor controller 6.

In a next step, an actual control pattern Actual-SM controlling the motor unit 2 and an actual rotor position Actual-RP of the rotor 4 resulting from the rotation of the rotor 4 using the actual control pattern Actual-SM are detected and fed back to the adaptive control module 7 for verification thereof.

Figure 2:
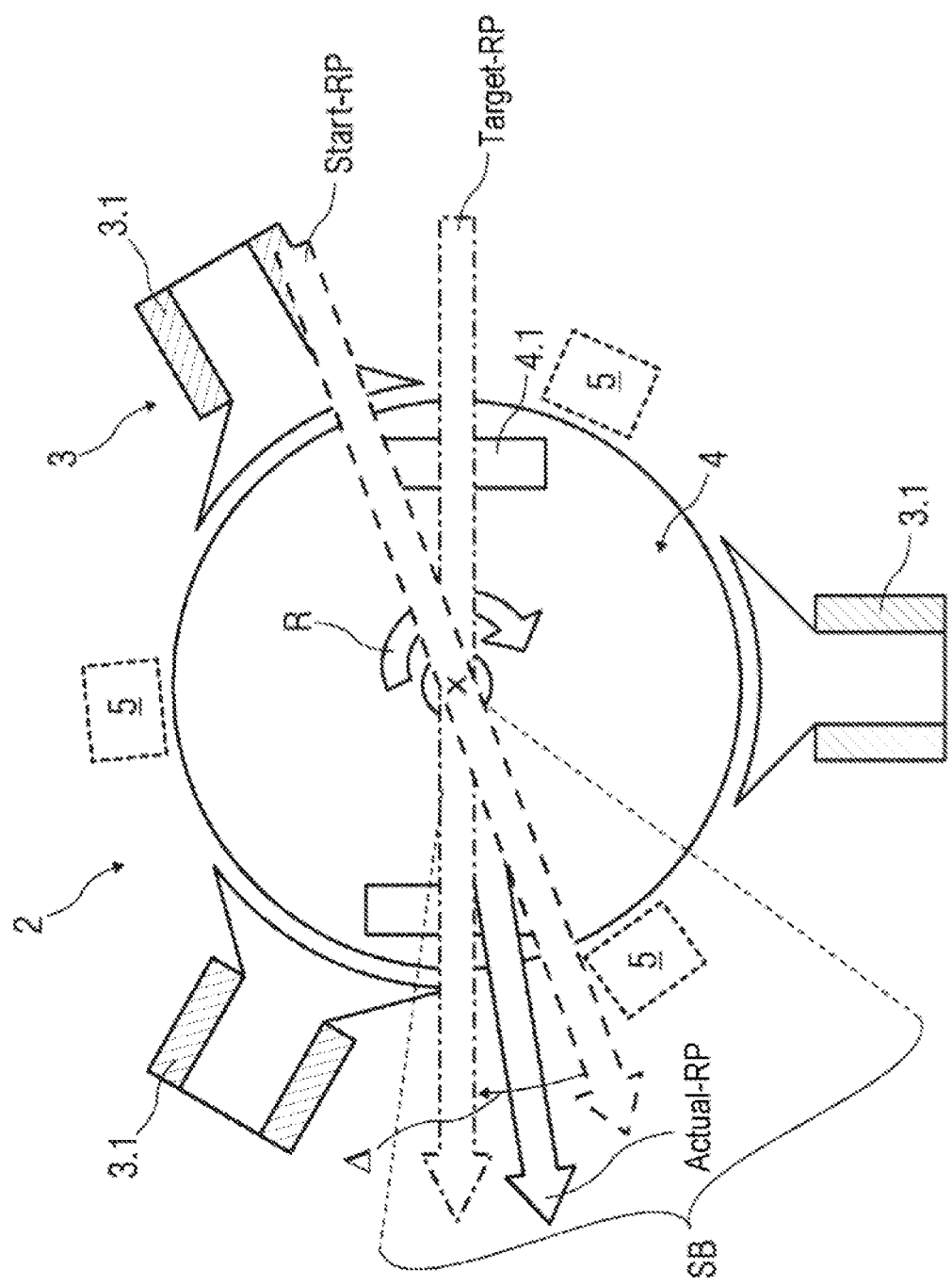
FIG. 2 schematically shows the exemplary motor unit with a rotor in various possible rotor positions.

FIG. 2 schematically shows an exemplary rotor 4 and the stator 3, which are magnetically coupled to one another.

As shown, the motor unit 2 is, for example, a direct-current motor. For example, the motor unit 2 is a brushless direct-current motor. The motor unit 2 may be of three-phase design.

The stator 3 includes a coil arrangement with three coils 3.1 offset electrically and through 120° in each case. The rotatable rotor 4 is arranged in the interior of the stator 3. For example, the rotor 4 includes a permanent magnet 4.1 which rotates about its own axis of rotation X as a function of the respective coils 3.1 being driven.

The motor unit 2 further includes one or more rotor position sensors 5 for detecting one of the rotor positions RP, such as a starting rotor position Start-RP of the rotor 4 in an inoperative or starting position of the rotor 4 or an actual rotor position Actual-RP during operation of the rotor 4.

Furthermore, the target rotor position Target-RP is shown in FIG. 2 in comparison with the starting rotor position Start-RP and the actual rotor position Actual-RP, which target rotor position is determined based on the starting rotor position Start-RP and the position offset ΔRP and lies within the specified or determined non-safety-critical position tolerance range SB.

Figure 3:
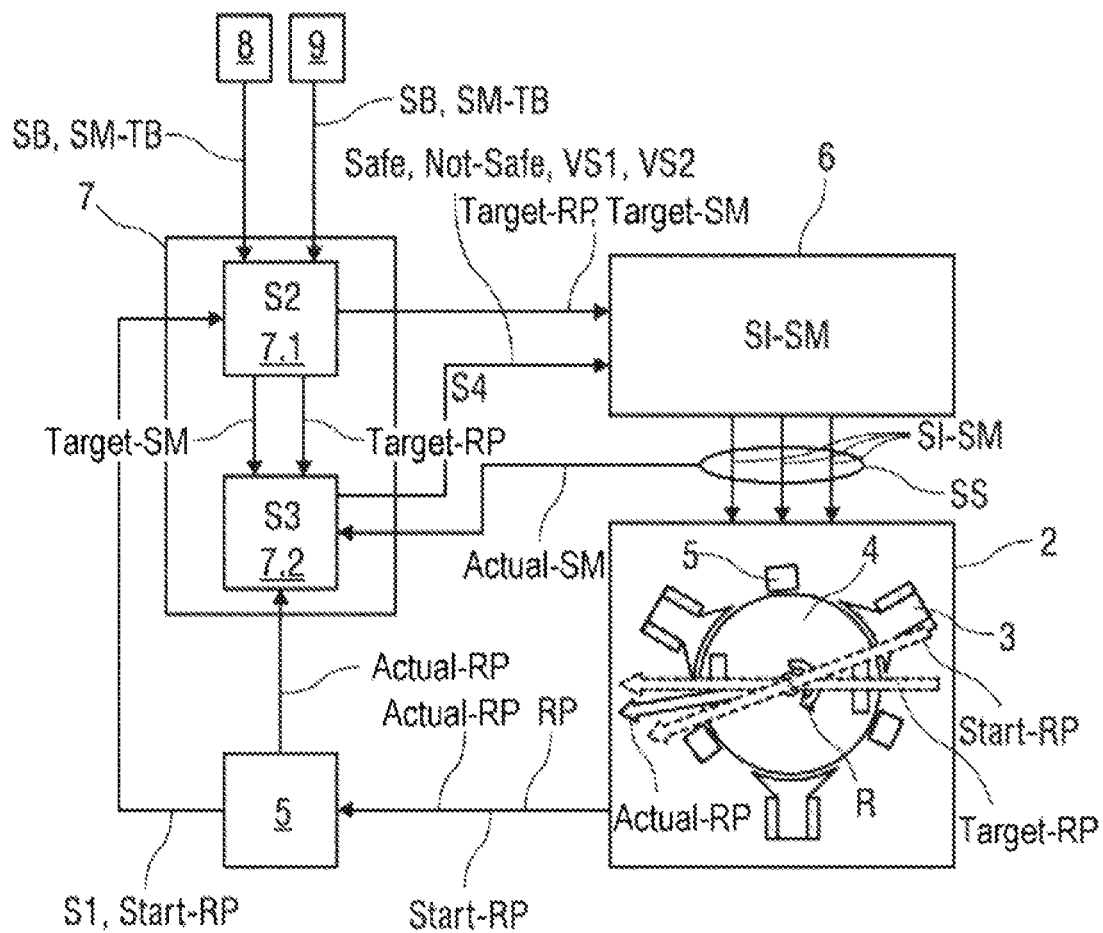
FIG. 3 schematically shows a block diagram for an exemplary method for controlling a motor unit.
Figure 4:
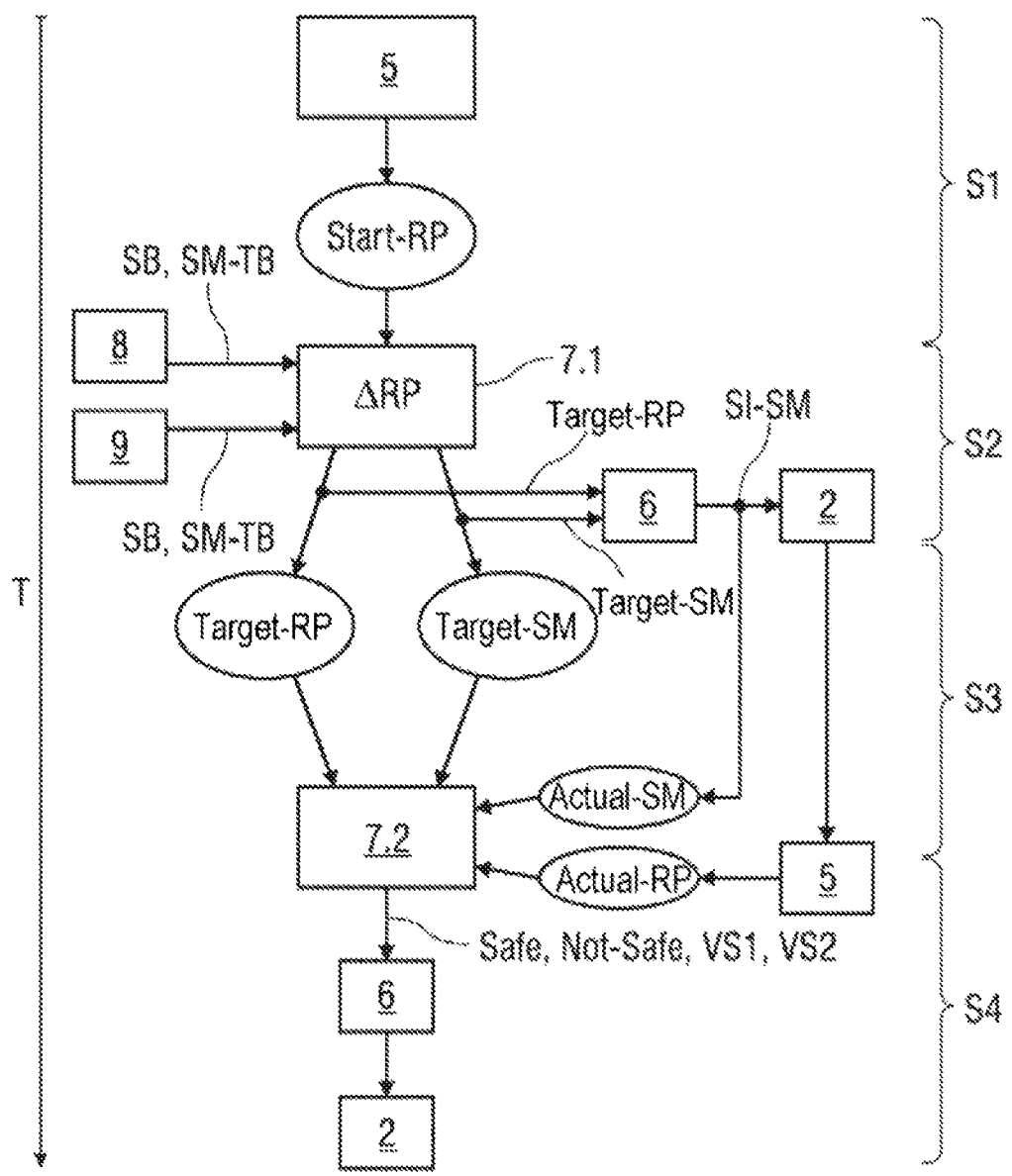
FIG. 4 schematically shows a block diagram of an exemplary time sequence of the method for operating the motor unit.

FIG. 3 schematically shows a block diagram of a method for operating, for example for performing open-loop control and/or closed-loop control on, the motor unit 2, and FIG. 4 shows a time sequence T of the method for operating, for example for performing open-loop control and/or closed-loop control on, the motor unit 2.

The method for operating, for example for performing open-loop control and/or closed-loop control on, the motor unit 2 is described in more detail below.

The motor unit 2 includes the motor controller 6 for operating, such as for performing open-loop control and/or closed-loop control on, the motor unit 2. For example, the motor controller 6 is provided to drive the rotor 4 via the stator 3. For example, the motor controller 6 includes a number of conventional hardware components, such as a pulse generator and a driver stage, such as a semiconductor, for example a transistor stage, which are designed to control the stator 3 and the rotor 4. For example, the coils 3.1 of the stator 3 are operated to move the rotor 4, for example excited by a current signal.

Furthermore, the motor unit 2 includes the control module 7, which can be adaptively connected upstream of the motor controller 6, as shown. That is, the control module 7 is connected between the motor unit 2 and the motor controller 6 for signaling purposes. As an alternative, the control module 7 may be implemented as a software module or as an electronic circuit in the motor controller 6 (not shown in any detail).

The control module 7 is designed as a diagnostic and/or monitoring unit for diagnosing or monitoring the motor controller 6 and is set up accordingly.

The control module 7 includes, for example, a signal processing device 7.1 for target value specification for the motor controller 6 and a verifier 7.2 for verifying the momentary state of the motor unit 2 in respect of whether it is in a safe or unsafe operating state.

The signal processing device 7.1 is coupled on the input side to the at least one rotor position sensor 5 and a memory unit 8 and/or an input unit 9 and on the output side to the motor controller 6 and the verifier 7.2.

For reliable operation of the motor unit 2, the starting rotor position Start-RP of the rotor 4 is detected before the motor unit 2 is commissioned or started. For this purpose, the rotor position sensor 5, for example a Hall sensor, measures the starting rotor position Start-RP in a first step S1 and supplies this to the signal processing device 7.1. For example, the non-safety-critical position tolerance range SB is stored in the memory unit 8 and is supplied to the signal processing device 7.1 via the coupling. As an alternative or in addition, the non-safety-critical position tolerance range SB can also be specified via the input unit 9 and supplied to the signal processing device 7.1.

In a second step S2, the possible position offset ΔRP is ascertained using the signal processing device 7.1 as a function of the non-safety-critical position tolerance range SB for the rotor position RP of the rotor 4. Furthermore, the target rotor position Target-RP is ascertained and supplied to the verifier 7.2 and the motor controller 6 based on the ascertained position offset ΔRP and the detected starting rotor position Start-RP using the signal processing device 7.1. For this purpose, the signal processing device 7.1 is coupled on the output side to the motor controller 6 and the verifier 7.2.

Furthermore, in the second step S2, a target control pattern Target-SM is ascertained based on the target rotor position Target-RP using the signal processing device 7.1, based on which target control pattern a motor control pattern SI-SM is generated and applied to the motor unit 2 to rotate the rotor 4 to the specified target rotor position Target-RP using the motor controller 6.

The rotor 4 is actively driven to the specified target rotor position Target-RP using the motor control pattern SI-SM, where at least one direction of movement of the rotor 4 and compliance with the position tolerance range SB are monitored. The motor control pattern SI-SM includes, for each phase of the motor unit 2, an associated driving pattern for the relevant magnetic fields and for driving the relevant coils 3.1.

In order to diagnose and monitor the motor controller 6, the target rotor position Target-RP and the target control pattern Target-SM are furthermore supplied to the verifier 7.2.

As shown, the direction of movement of the rotor 4, for example the direction of rotation R, is shown by an arrow in FIGS. 2 and 3.

In a third step S3, an actual control pattern Actual-SM controlling the motor unit 2 is detected at an interface SS between the motor controller 6 and the motor unit 2. Furthermore, the actual rotor position Actual-RP resulting from the rotation of the rotor 4 as a result of the controlling actual control pattern Actual-SM is detected using the rotor position sensor 5.

To verify the momentary state of the motor controller 6 and/or the motor unit 2, the detected actual rotor position Actual-RP and the actual control pattern Actual-SM are fed back in the third step S3 by way of being supplied, for example, to the verifier 7.2 or a corresponding module of the motor controller 6 in the third step S3.

In some examples, when the rotor 4 is driven using the target control pattern Target-SM, a rotor position profile is monitored, where driving of the rotor 4 is interrupted in the case of ascertained imminent impermissible overshooting of the position tolerance range SB. For example, when the motor unit 2 is commissioned, start-up of the motor unit 2 can be monitored. Furthermore, a rotor movement can also be continuously monitored for compliance with the position tolerance range SB during operation of the motor unit 2.

In a fourth step S4, a safety signal Safe, Not-safe is generated and/or output and/or transmitted, for example, based on the fed-back actual control pattern Actual-SM and/or the fed-back actual rotor position Actual-RP.

For this purpose, for example, in a first verification stage, the detected and fed-back actual control pattern Actual-SM is compared with the target control pattern Target-SM using the verifier 7.2. If the actual control pattern Actual-SM lies within a specified control tolerance range SM-TB, a first verification signal VS1 is generated as a safety signal Safe, otherwise the first verification signal VS1 is not generated or an error signal Not-safe is generated.

The first verification signal VS1 is, for example, an activation signal which activates driving of the rotor 4. Failure to generate the first verification signal VS1 or the error signal Not-safe deactivates the rotor 4 or ensures that the rotor 4 remains deactivated.

The control tolerance range SM-TB is, for example, a switching/hardware/operating tolerance range for the motor control pattern SI-SM or the control profile and describes the tolerance (for example from +/−1% to +/−3%) with which the control signals/pulses may be generated using a conventional pulse generator. The control tolerance range SM-TB is thus a non-safety-critical control range which limits the generated control signals or control pulses upward or downward (with a maximum lower and/or maximum upper deviation).

As an alternative or in addition, the verifier 7.2 can be set up, in the fourth step S4 and for example in the first verification stage, to compare the detected and fed-back actual control pattern Actual-SM with the target control pattern Target-SM. If the actual control pattern Actual-SM lies within the control tolerance range SM-TB, the motor controller 6 is or remains activated, otherwise the motor controller 6 is deactivated (for example interrupted).

As already described above in the general part, the control tolerance range SM-TB can be determined based on at least one or more upper control limit values and/or at least one or more lower control limit values for the target control pattern Target-SM.

In the fourth step S4, a second verification stage is furthermore performed using the verifier 7.2. During the second verification stage the detected and fed-back actual rotor position Actual-RP is compared with the target rotor position Target-RP, where, if the detected actual rotor position Actual-RP is the same as the specified target rotor position Target-RP and lies within the specified non-safety-critical position tolerance range SB, a second verification signal VS2 is generated as a safety signal Safe, otherwise the second verification signal VS2 is not generated or an error signal Not-safe is generated.

As an alternative or in addition, the verifier 7.2 can be set up, in the fourth step S4 and for example in a second verification stage, to compare the detected actual rotor position Actual-RP with the target rotor position Target-RP. If the detected actual rotor position Actual-RP is the same as the specified target rotor position Target-RP and lies within the specified position tolerance range SB, the motor controller 6 is or remains activated, otherwise the motor controller 6 is deactivated (for example interrupted) or an error signal Not-safe is generated.

The specified position tolerance range SB for the always safe movement of the rotor 4 can be determined and/or specified, for example, based on at least one or more upper position limit value(s) and/or at least one or more lower position limit value(s). Both when determining the specified position tolerance range SB and the control tolerance range SM-TB, measurement tolerances of the rotor position sensor 5, manufacturing tolerances of the motor unit 2 and/or position tolerances of the rotor 4 have to be taken into account using at least one tolerance factor.

The position tolerance range SB defines, for example, a non-safety-critical movement range of the rotor 4, where the rotor 4 can be moved within the position tolerance range SB, without causing critical situations which relate, for example, to safety requirements according to ISO standard 26262. For example, the position tolerance range SB represents a movement tolerance range in which the rotor 4 can be moved during commissioning, during starting and/or during operation. The position tolerance range SB is defined, for example, as an angular range.

The same applies to the momentary movement, such as adjustment and rotation, of the rotor 4. That is, the method described ensures that momentary adjustment of the rotor 4 may be performed only within the position tolerance range SB. For this purpose, the method provides that driving of the rotor 4 is stopped when imminent impermissible overshooting of the position tolerance range SB is ascertained.

If, on the other hand, it is ascertained using the verifier 7.2 that the momentary actual rotor position Actual-RP lies within the position tolerance range SB, possibly also taking into account sensor, manufacturing and/or control tolerances, driving of the rotor 4 carried out according to the target control pattern Target-SM is considered to be reliably verified. The motor unit 2 may continue to be operated as a safety-related system.

Furthermore, the method provides that the direction of movement of the rotor 4 is determined continuously. For example, a rotor position RP, such as the actual rotor position Actual-RP, is detected continuously, so that the direction of movement can be determined. The respective direction of movement, in particular the direction of rotation, of the rotor 4 can be ascertained from the delta between two actual positions Actual-RP.

For example, the angular position φ of the rotor 4 in the starting rotor position Start-RP is equal to 250°.

Furthermore, the non-safety-critical position tolerance range SB for the rotor 4 is determined. For example, the non-safety-critical position tolerance range SB is specified in angular range values of, for example, 220° to 280°.

A possible position offset ΔRP, for example of +20°, is determined based on the non-safety-critical position tolerance range SB and the detected starting rotor position Start-RP.

The target rotor position Target-RP is ascertained from the starting rotor position Start-RP and the ascertained position offset ΔRP, which target rotor position the rotor 4 can reliably assume and, in the example, is 270° according to:

Target-RP=Start-RP+ΔRP=250°+20°

Target-RP=270°.

If a rotor position RP outside the position tolerance range SB is ascertained based on the feedback of the momentary actual rotor position Actual-RP, the motor controller 6 is deactivated. If, on the other hand, the momentary actual rotor position Actual-RP lies within the position tolerance range SB, the motor controller 6 is activated or remains activated and the rotor 4 can be adjusted.

The motor controller 6 includes a conventional pulse-width-modulation unit in a manner not shown in any detail. For example, the pulse-width-modulation unit is designed to control the hardware components of the motor controller 6. For example, the motor control pattern SI-SM is transmitted to the hardware component of the motor controller 6 via the pulse-width-modulation unit. The hardware drives the motor unit 2 based on the specified motor control pattern SI-SM.

The motor unit 2 further includes a conventional motor control device, such as a PI controller, also known as a proportional-integral controller. The PI controller may be part of the motor controller 6 or else of the signal processing device 7.1 and includes the actual rotation speed of the rotor 4 as the output control variable and the target rotation speed as the reference variable. The present method is adaptively connected upstream of the motor control device and the motor controller 6 and deactivates the motor control device and the motor controller 6 if an unsafe state of the motor controller 6 is ascertained by way of feeding back the actual control pattern Actual-SM and/or an unsafe state of the motor unit 2 is ascertained by way of feeding back the actual rotor position Actual-RP.

One example provides that correct movement execution during commissioning or during operation or after operation of the rotor 4 is checked by way of feeding back the actual control pattern Actual-SM and/or the actual rotor position Actual-RP, where, after the rotor 4 has been driven, the resulting momentary actual rotor position Actual-RP of the rotor 4 is detected as a function of the target control pattern Target-SM and this is compared with the ascertained target rotor position Target-RP. That is to say, by way of feeding back and for example back-measuring the actual rotor position Actual-RP, which the rotor position sensor 5 detects after the motor control pattern SI-SM is applied, correct execution of the movement of the motor unit 2, for example as a function of correct driving, such as energization of the coils 3.1, can be checked.

A number of implementations have been described. Nevertheless, it will be understood that various modifications may be made without departing from the spirit and scope of the disclosure. Accordingly, other implementations are within the scope of the following claims.

What is claimed is:

1. A method for controlling a motor unit with a rotor and a stator, the method comprising:
   detecting a starting rotor position of the rotor;

ascertaining or specifying at least one non-safety-critical position tolerance range;
ascertaining or specifying at least one position offset for the rotor as a function of the ascertained or specified position tolerance range;
ascertaining a target rotor position for the rotor based on the starting rotor position and the position offset;
specifying a target control pattern based on the ascertained target rotor position;
generating and applying a motor control pattern to the motor unit to rotate the rotor to the ascertained target rotor position using the target control pattern;
detecting an actual control pattern controlling the motor unit at an interface between the motor controller and the motor unit;
detecting an actual rotor position of the rotor resulting from the rotation of the rotor using the motor control pattern; and
feeding back both the detected actual control pattern and the detected actual rotor position for verification thereof.

2. The method of claim 1, wherein a safety signal and/or an error signal are/is generated and/or output and/or transmitted based on the fed-back actual control pattern and/or the fed-back actual rotor position.

3. The method of claim 2, further comprising, in a first verification stage:
comparing the detected actual control pattern with the target control pattern;
when the actual control pattern lies within a specified control tolerance range, generating a first verification signal as a safety signal; and
when the actual control pattern does not lie within the specified control tolerance range, generating the error signal indicative of the first verification signal not generated.

4. The method of claim 3, further comprising, in one or in the first verification stage:
comparing the detected actual control pattern with the target control pattern;
when the actual control pattern lies within the specified control tolerance range, the motor controller is activated or remains activated; and
when the actual control pattern does not lie within the specified control tolerance range, the motor controller is deactivated.

5. The method of claim 4, further comprising: determining the control tolerance range based on at least one or more upper control limit values and/or at least one or more lower control limit values for the target control pattern.

6. The method of claim 3, wherein, when determining the specified position tolerance range and/or the control tolerance range, measurement tolerances of a rotor position sensor, manufacturing tolerances of the motor unit and/or position tolerances of the rotor are taken into account using at least one tolerance factor.

7. The method of claim 1, further comprising, in a second verification stage:
comparing the detected actual rotor position with the target rotor position;
when the detected actual rotor position is the same as the ascertained target rotor position and/or lies within the specified non-safety-critical position tolerance range, generating a second verification signal as a safety signal; and
when the detected actual rotor position is not the same as the ascertained target rotor position and/or does not lie within the specified non-safety-critical position tolerance range, generating an error signal indicative of the second verification signal not generated.

8. The method of claim 1, wherein, in a second verification stage, the detected actual rotor position is compared with the target rotor position, wherein, if the detected actual rotor position is the same as the ascertained target rotor position and/or lies within the specified position tolerance range, the motor controller is or remains activated, otherwise the motor controller is deactivated or an error signal is generated.

9. The method of claim 1, further comprising determining and/or specifying the specified position tolerance range for the rotor based on at least one or more upper position limit value(s) and/or at least one or more lower position limit value(s).

10. The method of claim 1, further comprising continuously determining direction of movement of the rotor.

11. A motor unit comprising:
a stator;
a rotor having a starting rotor position;
a rotor position sensor detecting a starting rotor position of the rotor;
a motor controller rotating the rotor, the motor controller driving and operating the motor unit by applying a motor control pattern to a specified target rotor position using a target control pattern; and
a control module connected upstream of the motor controller or is part of the motor controller, the control module is set up to check and activate or to deactivate the motor controller, the control module configured to execute a method comprising:
ascertaining or specifying at least one non-safety-critical position tolerance range;
ascertaining or specifying at least one position offset for the rotor as a function of the ascertained or specified position tolerance range;
ascertaining a target rotor position for the rotor based on the starting rotor position and the position offset;
specifying a target control pattern based on the ascertained target rotor position;
generating the motor control pattern causing the rotor to rotate to the ascertained target rotor position using the target control pattern;
detecting an actual control pattern controlling the motor unit at an interface between the motor controller and the motor unit;
detecting an actual rotor position of the rotor resulting from the rotation of the rotor using the motor control pattern; and
feeding back both the detected actual control pattern and the detected actual rotor position for verification thereof.

12. A motor unit comprising:
a stator;
a rotor;
a rotor position sensor detecting a starting rotor position of the rotor;
a motor controller rotating the rotor, the motor controller driving and operating the motor unit by applying a motor control pattern; and
a control module connected upstream of the motor controller or is part of the motor controller, the control module feeds back the actual rotor position and/or the actual control pattern to the motor controller the control module configured to execute a method comprising:

ascertaining or specifying at least one non-safety-critical position tolerance range;

ascertaining or specifying at least one position offset for the rotor as a function of the ascertained or specified position tolerance range;

ascertaining a target rotor position for the rotor based on the starting rotor position and the position offset;

specifying a target control pattern based on the ascertained target rotor position;

generating the motor control pattern causing the rotor to rotate to the ascertained target rotor position using the target control pattern;

detecting an actual control pattern controlling the motor unit at an interface between the motor controller and the motor unit;

detecting an actual rotor position of the rotor resulting from the rotation of the rotor using the motor control pattern; and feeding back both the detected actual control pattern and the detected actual rotor position for verification thereof.

\* \* \* \* \*